US012784570B2

(12) United States Patent
Fan et al.

(10) Patent No.: US 12,784,570 B2
(45) Date of Patent: Nov. 3, 2026

(54) INTELLIGENT TOILET BOWL, TOILET AND MONITORING SYSTEM

(71) Applicant: LIXIL (CHINA) INVESTMENT CO., LTD., Shanghai (CN)

(72) Inventors: Zhongde Fan, Shanghai (CN); Yang Jiang, Shanghai (CN); Dan Cao, Shanghai (CN); Junyan Xu, Shanghai (CN); Guanming Cai, Shanghai (CN); Yangang Jin, Shanghai (CN)

(73) Assignee: LIXIL (CHINA) INVESTMENT CO., LTD., Shanghai (CN)

( * ) Notice: Subject to any disclaimer, the term of this patent is extended or adjusted under 35 U.S.C. 154(b) by 99 days.

(21) Appl. No.: 18/846,444

(22) PCT Filed: Mar. 16, 2023

(86) PCT No.: PCT/CN2023/081930

§ 371 (c)(1),
(2) Date: Sep. 12, 2024

(87) PCT Pub. No.: WO2023/179453

PCT Pub. Date: Sep. 28, 2023

(65) Prior Publication Data

US 2025/0191457 A1 Jun. 12, 2025

(30) Foreign Application Priority Data

Mar. 22, 2022 (CN) ......................... 202220684059.7

(51) Int. Cl.
*G08B 21/24* (2006.01)
*A47K 13/30* (2006.01)
*H04L 67/12* (2022.01)

(52) U.S. Cl.
CPC ........... *G08B 21/24* (2013.01); *A47K 13/305* (2013.01); *H04L 67/12* (2013.01)

(58) Field of Classification Search
CPC ...... G08B 21/24; G08B 21/02; A47K 13/305; A47K 13/24; A47K 13/00; H04L 67/12; G06Q 50/22; E03D 9/04
(Continued)

(56) References Cited

U.S. PATENT DOCUMENTS

2019/0272727 A1 * 9/2019 Yang .................. G08B 21/0492
2020/0337509 A1 * 10/2020 Ho ......................... A47K 13/10
(Continued)

FOREIGN PATENT DOCUMENTS

CN 205881115 U 1/2017
CN 106638850 A * 5/2017 ............. A47K 13/10
(Continued)

OTHER PUBLICATIONS

International Search Report and Written Opinion for PCT/CN2023/081930 dated Jun. 8, 2023; 13 pages including English translation.

*Primary Examiner* — Lori L Baker
(74) *Attorney, Agent, or Firm* — Schwabe, Williamson & Wyatt, P.C.

(57) ABSTRACT

The intelligent toilet seat includes a toilet seat box, a toilet seat ring, a reminder button, and a control device. The toilet seat box includes a seat box housing defining a cavity therein. The toilet seat ring is pivotally connected with the toilet seat box. The reminder button is arranged on a side wall of the seat box housing and configured to accept an input operation to generate a trigger signal. The control device is accommodated in the cavity and includes a control module and an IoT communication module. The control module is electrically connected with the reminder button and the IoT communication module respectively, and is configured to trigger the IoT communication module to wirelessly send a reminder signal to an outside upon receiving the trigger signal from the reminder button.

14 Claims, 4 Drawing Sheets

(58) Field of Classification Search
USPC ........................................ 4/237, 234, 98, 217
See application file for complete search history.

(56) References Cited

U.S. PATENT DOCUMENTS

| | | | | |
|---|---|---|---|---|
| 2021/0207352 | A1* | 7/2021 | Kim | E03D 5/022 |
| 2021/0278358 | A1* | 9/2021 | Hall | E03D 11/11 |

FOREIGN PATENT DOCUMENTS

| | | | | | |
|---|---|---|---|---|---|
| CN | 106991787 | A | * | 7/2017 | G08B 21/0423 |
| CN | 109138093 | A | * | 1/2019 | A47K 13/24 |
| CN | 109222735 | A | * | 1/2019 | A47K 13/30 |
| CN | 209686533 | U | * | 11/2019 | A47K 17/026 |
| CN | 211375754 | U | * | 8/2020 | A47K 17/026 |
| CN | 214884161 | U | * | 11/2021 | A47K 17/026 |
| CN | 218606349 | U | | 3/2023 | |
| CN | 223810601 | U | * | 1/2026 | A47K 17/026 |
| JP | 2019090169 | A | * | 6/2019 | A47K 17/026 |
| JP | 3224802 | U | * | 1/2020 | A47K 13/30 |
| KR | 100919249 | B1 | * | 9/2009 | E03D 5/105 |

* cited by examiner

INTELLIGENT TOILET BOWL, TOILET AND MONITORING SYSTEM

CROSS-REFERENCE TO RELATED APPLICATIONS

This application is the national phase of International Application No. PCT/CN2023/081930, filed on Mar. 16, 2023, which claims the benefit of priority to Chinese patent application No. 202220684059.7, filed on Mar. 22, 2022, entitled "Intelligent Toilet Seat, Toilet and Monitoring System", the entire disclosures of which are incorporated herein by reference.

TECHNICAL FIELD

The present disclosure generally relates to an intelligent toilet solution based on an IoT technology, and more particularly to an intelligent toilet seat suitable for elderly people, a toilet including the intelligent toilet seat and a monitoring system based on the intelligent toilet seat.

BACKGROUND

Currently, with an improvement of people's life quality, traditional toilets have gradually been replaced by intelligent toilets. The intelligent toilets have humanized functions such as hip cleaning, mobile cleaning, seat ring heat preservation, warm air drying, automatic deodorization and silent seating. However, with an aging of a population age structure, there is a new demand for intelligent toilets. For example, if elderly people live alone at home and their sons and daughters are working or out of town and unable to be with them, it is expected to use an intelligent function of the intelligent toilets to promptly receive signals from elderly people during using the intelligent toilets. However, there is no better solution in the existing intelligent toilets.

SUMMARY OF THE DISCLOSURE

In view of the above-mentioned problem, according to one aspect of the present disclosure, an intelligent toilet seat is provided. The intelligent toilet seat includes: a toilet seat box including a seat box housing, wherein the seat box housing defines a cavity therein; a toilet seat ring pivotally connected with the toilet seat box; a reminder button arranged on a side wall of the seat box housing and configured to accept an input operation to generate a trigger signal; and a control device accommodated in the cavity and including a control module and an IoT communication module, wherein the control module is electrically connected with the reminder button and the IoT communication module respectively, and is configured to trigger the IoT communication module to wirelessly send a reminder signal to an outside upon receiving the trigger signal from the reminder button.

According to some embodiments, the reminder signal includes at least one selected from a group consisting of a reminder signal sent continuously, a reminder signal sent at a predetermined frequency, a reminder signal sent for a predetermined duration and a reminder signal sent once.

According to some embodiments, the intelligent toilet seat further includes a toilet cover pivotally connected with the toilet seat box, and the toilet cover and the toilet seat ring are respectively connected with the toilet seat box through pivoting shafts parallel to each other.

According to some embodiments, the intelligent toilet seat further includes a temperature adjustment button arranged on the side wall of the seat box housing and electrically connected with the control module, and the temperature adjustment button includes a temperature increase button and a temperature decrease button.

According to some embodiments, the intelligent toilet seat further includes one or more seating sensors attached to the toilet seat ring, and the one or more seating sensors are respectively electrically connected with the control module and configured to detect whether the toilet seat ring is seated and transmit a detection result to the control module.

According to some embodiments, the intelligent toilet seat further includes a heater configured to heat the toilet seat ring, and the heater is arranged in a housing of the toilet seat ring and electrically connected with the control module.

According to some embodiments, the intelligent toilet seat further includes a heating indicator light arranged on the side wall of the seat box housing and electrically connected with the control module, and the heating indicator light has a light-on state indicating that the toilet seat ring is being heated and a light-off state indicating that the toilet seat ring is not being heated.

According to some embodiments, the intelligent toilet seat further includes a connection indicator light arranged on the side wall of the seat box housing and electrically connected with the control module, and the connection indicator light has a long light-on state indicating that a network connection of the IoT communication module is normal, a light-off state indicating that a network connection function of the IoT communication module is turned off, a light slow flashing state indicating that the network connection of the IoT communication module is disconnected, and a light quick flashing state indicating that the IoT communication module is being remotely upgraded or allocated.

According to some embodiments, the intelligent toilet seat further includes a buzzer arranged in the cavity or on the side wall of the seat box housing and electrically connected with the control module, and the buzzer is configured to output a prompt sound based on the trigger signal.

According to some embodiments, the control device further includes a timing module electrically connected with or integrated with the control module, and the timing module is configured to time how long the toilet seat ring is seated and/or heated.

According to some embodiments, the control device further includes a power supply configured to provide power to an electrical module of the control device.

According to another aspect of the present application, a toilet is provided. The toilet includes: a toilet body; and an intelligent toilet seat as described above, wherein the intelligent toilet seat is detachably connected with the toilet body.

According to yet another aspect of the present application, a monitoring system based on an intelligent toilet seat is provided. The monitoring system includes: an intelligent toilet seat as described above; and one or multiple APPs installed on a user equipment and/or a cloud server of the intelligent toilet seat, wherein data associated with the intelligent toilet seat is wirelessly transmitted between the intelligent toilet seat and the one or multiple APPs, and the one or multiple APPs are configured to remotely control the intelligent toilet seat.

According to some embodiments, the monitoring system includes the multiple APPs, wherein one APP wirelessly communicates with one or more of the intelligent toilet seat, other APPs and the cloud server to transmit data associated with the intelligent toilet seat.

According to some embodiments, the intelligent toilet seat wirelessly communicates with the cloud server via a router.

DETAILED DESCRIPTION

Figure 1:
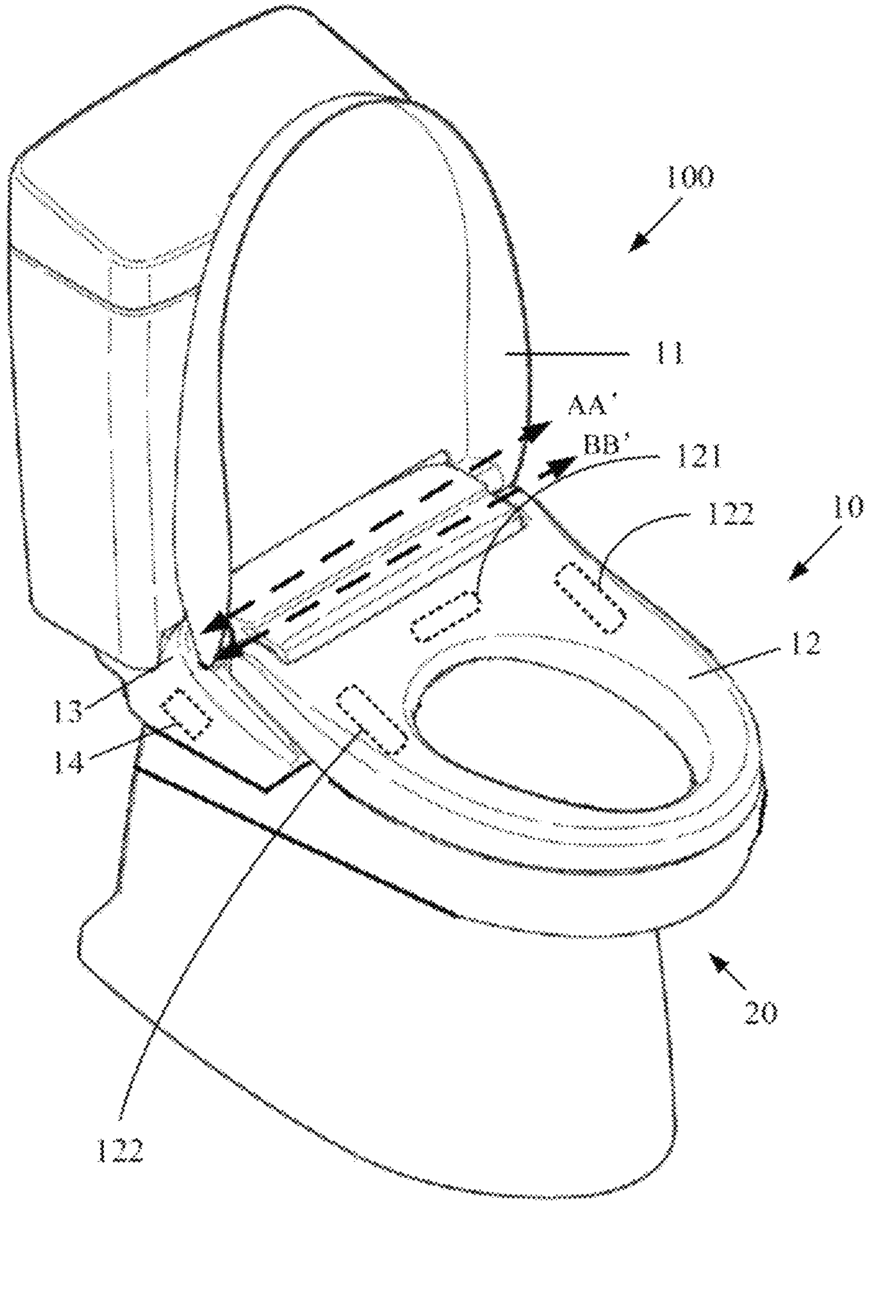
FIG. 1 is a schematic view illustrating a toilet according to an embodiment of the present disclosure.

The terms used herein, such as "inside" and "outside", "up" and "down", "front" and "back", "left" and "right", are intended to describe relative orientation between components of the toilet or toilet seat shown in the drawings, and are not intended to limit the scope of the present disclosure, nor are they intended to limit the scope of the present disclosure to the embodiments shown in the drawings.

The embodiments of the present disclosure will be introduced in conjunction with the accompanying drawings below.

FIG. 1 schematically illustrates a toilet 100 according to an embodiment of the present disclosure. The toilet 100 includes an intelligent toilet seat 10 and a toilet body 20. The intelligent toilet seat 10 is detachably connected with the toilet body 20. For example, the intelligent toilet seat 10 can be easily installed onto the toilet body 20 through a fixing plate (not shown) as an accessory of the toilet 100. According to some embodiments of the present disclosure, the intelligent toilet seat 10 may have a universal size to be suitable for a toilet body with a universal size. The intelligent toilet seat 10 may also have a customized size to be suitable for a toilet body with a specific size.

Figure 2:
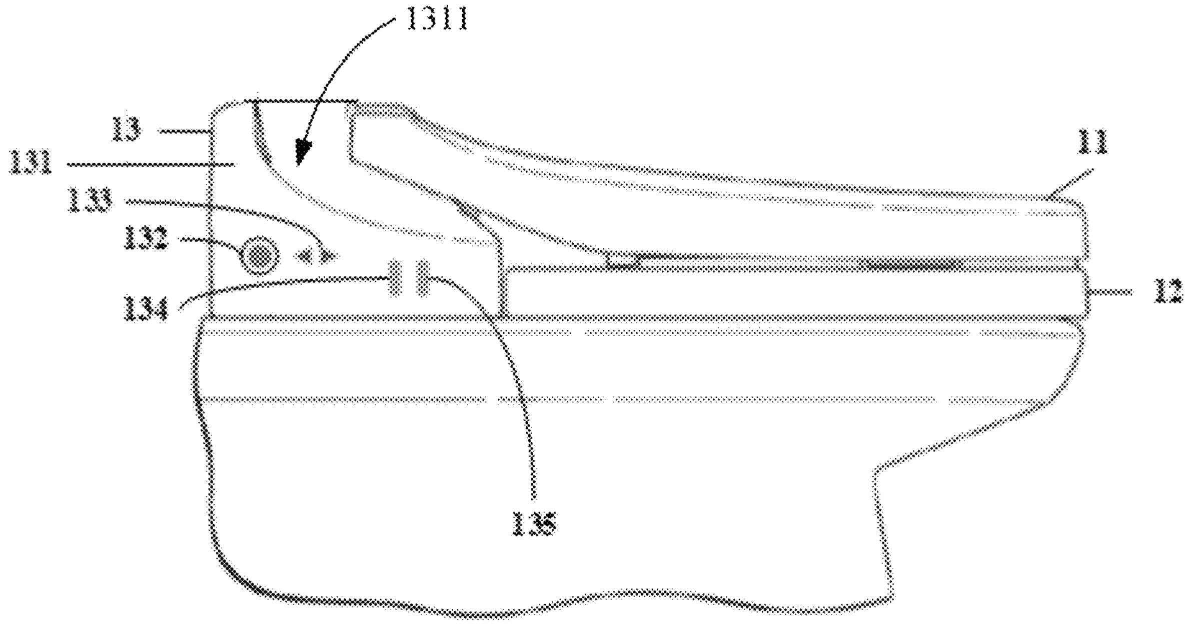
FIG. 2 is a schematic view illustrating an intelligent toilet seat of the toilet shown in FIG. 1 according to an embodiment of the present disclosure.

FIG. 2 illustrates an embodiment of the intelligent toilet seat 10. Next, referring to FIGS. 1 and 2, the structure and working principle of the intelligent toilet seat 10 will be explained.

The intelligent toilet seat 10 includes a toilet cover 11, a toilet seat ring 12, a toilet seat box 13 and a control device 14.

The toilet cover 11 is pivotally connected with the toilet seat box 13, that is, the toilet cover 11 is supported by a shaft of the toilet seat box 13. For example, a rear portion of the toilet cover 11 is connected with the toilet seat box 13 through a first pivoting shaft AA'. The toilet cover 11 can rotate relative to the toilet body 20 between an upright state and a flat state. FIG. 1 illustrates the upright state of the toilet cover 11, and FIG. 2 illustrates the flat state of the toilet cover 11.

The toilet seat ring 12 is roughly O-shaped when viewed from above. The toilet seat ring 12 is pivotally connected with the toilet seat box 13, that is, the toilet seat ring 12 is supported by a shaft of the toilet seat box 13. For example, a rear portion of the toilet seat ring 12 is connected with the toilet seat box 13 through a second pivoting shaft BB' parallel to the first pivoting shaft AA'. The toilet seat ring 12 can rotate relative to the toilet body 20 between an upright state and a flat state. FIGS. 1 and 2 illustrate the flat state of the toilet seat ring 12.

In some embodiments, the intelligent toilet seat 10 further includes a seating sensor 121 attached to the toilet seat ring 12. When viewed from above, the seating sensor 121 overlaps with the toilet seat ring 12. The seating sensor 121 detects whether a user of the toilet 100 is seated on the toilet seat ring 12 and transmits a detection result to the control device 14. The seating sensor 121 may be arranged on a bottom surface of the toilet seat ring 12. The seating sensor 121 can be implemented as a capacitive load sensor. When the seating sensor 121 detects that the user is seated on the toilet seat ring 12, a load acting on the sensor is converted into an electrical signal (such as a capacitive signal) through the sensor and transmitted to the control device 14. The seating sensor 121 can be hidden at a buffering member (not shown) on the bottom surface of the toilet seat ring 12. The number of the seating sensor 121 may be one or more, such as one, two, three, or four. When there are multiple seating sensors 121, the multiple seating sensors 121 are arranged separately from each other at different positions on the toilet seat ring 12 to detect the load acting on each sensor by different parts of a thigh of the user of the toilet 100.

In some embodiment, the intelligent toilet seat 10 further includes a heater 122. The heater 122 is arranged in a housing of the toilet seat ring 12 and configured to controllably heat the toilet seat ring 12. The heater 122 can be implemented as multiple heating blocks evenly arranged along the toilet seat ring 12, or as a heating belt along the toilet seat ring 12, thereby providing uniform heating to the toilet seat ring 12 and avoiding heat concentration in certain areas of the toilet seat ring 12.

The intelligent toilet seat 10 may be detachably attached to the toilet body 20 through the toilet seat box 13. For example, a buckle structure is arranged at a bottom of the toilet seat box 13. The above-mentioned fixing plate as an accessory of the toilet 100 is installed on the toilet body 20, and the fixing plate also has a buckle structure. The buckle structure at the bottom of the toilet seat box 13 is locked with the buckle structure of the fixing plate, thereby fixing the intelligent toilet seat 10 to the toilet body 20.

Referring to FIG. 2, the toilet seat box 13 includes a seat box housing 131, and the seat box housing 131 defines (surrounds) a cavity 1311. The control device 14 is accommodated in the cavity 1311.

A reminder button 132, a temperature adjustment button 133, a heating indicator light 134 and a connection indicator light 135 are arranged on a side wall of the seat box housing 131. In some embodiments, as shown in FIG. 2, the reminder button 132, the temperature adjustment button 133, the heating indicator light 134 and the connection indicator light 135 are all arranged on the same side wall of the seat box housing 131. In other embodiments, some of the reminder button 132, the temperature adjustment button 133, the heating indicator light 134 and the connection indicator light 135 may be arranged on one side wall of the seat box housing 131 and the others may be arranged on another side wall of the seat box housing 131.

The reminder button 132 includes a portion exposed out of the seat box housing 131 and a portion hidden in the seat box housing 131. The portion exposed out of the seat box housing 131 can accept an input operation, such as a pressing operation by the user of the toilet 100 in case of emergency. The portion hidden in the seat box housing 131 is electrically connected with the control device 14, for example, through a wire. When the reminder button 132 is pressed, a trigger signal is generated and transmitted to the control device 14. The reminder button 132 has a triggered state and a non-triggered state. The triggered state refers to a state where a trigger signal is generated upon receiving a press. The non-triggered state refers to a state where no pressing is received and no trigger signal is generated. The reminder button 132 can be implemented in various forms, such as a pressing type, a sliding type, a toggling type, a touching type, and so on. Correspondingly, "input operation" includes an action taken by the user of the toilet 100 to trigger the reminder button 132 based on the type of the reminder button 132, such as pressing, touching, sliding, and so on.

In some embodiments, the reminder button 132 is implemented to automatically reset upon receiving an input operation, that is, the reminder button 132 switches to the triggered state and outputs a trigger signal after receiving the input operation, and then automatically returns to the non-triggered state. In other embodiments, the reminder button 132 is implemented to switch to the triggered state and output a trigger signal upon receiving an input operation, and to return to the non-triggered state upon receiving another input operation.

The temperature adjustment button 133 includes a temperature increase button and a temperature decrease button. For example, the temperature increase button has a forward or upward arrow pattern. The temperature decrease button has a backward or downward arrow pattern. The temperature increase button and the temperature decrease button each includes a portion exposed out of the seat box housing 131 and a portion hidden in the seat box housing 131. The portion exposed out of the seat box housing 131 can accept an input operation, such as a heating operation or a cooling operation of the user of the toilet 100. The portion hidden in the seat box housing 131 is electrically connected with the control device 14, for example, through a wire, to transmit a heating signal or a cooling signal to the control device 14 in response to the heating operation or the cooling operation. The temperature adjustment button 133 can be implemented in various forms, such as a knob type, a slide type, a touch type, and so on.

The heating indicator light 134 is configured to indicate whether the toilet seat ring 12 is being heated. The heating indicator light 134 has a light-on state indicating that the toilet seat ring 12 is being heated and a light-off state indicating that the toilet seat ring 12 is not being heated. The heating indicator light 134 includes a portion exposed out of the seat box housing 131 and a portion hidden in the seat box housing 131. The portion exposed out of the seat box housing 131 is configured to present the light-on state or the light-off state. The portion hidden in the seat box housing 131 is electrically connected with the control device 14, for example, through a wire, to change the light-on state or the light-off state under the control of the control device.

The connection indicator light 135 is configured to indicate a connection state (a network connection state) of an IoT communication module 142. The connection indicator light 135 has a long light-on state indicating that a network connection of the IoT communication module 142 is normal, a light-off state indicating that a network connection function of the IoT communication module 142 is turned off (for example, a WiFi function is turned off), a light slow flashing state indicating that the network connection of the IoT communication module 142 is disconnected, and a light quick flashing state indicating that the IoT communication module 142 is being remotely upgraded or allocated. User devices may be electrical devices such as smartphones or tablets belonging to the user of the toilet 100 or relatives of the user of the toilet 100. The connection indicator light 135 includes a portion exposed out of the seat box housing 131 and a portion hidden in the seat box housing 131. The portion exposed out of the seat box housing 131 is configured to present one of the above states: the long light-on state, the light-off state, the light slow flashing state, and the light quick flashing state. The portion hidden in the seat box housing 131 is electrically connected with the control device 14, for example, through a wire, to change the state of the connection indicator light corresponding to the state of the network connection under the control of the control device 14.

It should be understood that the shapes of the reminder button 132, the temperature adjustment button 133, the heating indicator light 134 and the connection indicator light 135 shown in FIG. 2 are only illustrative examples, and other suitable shapes may be employed according to some embodiments of the present disclosure.

Figure 3:
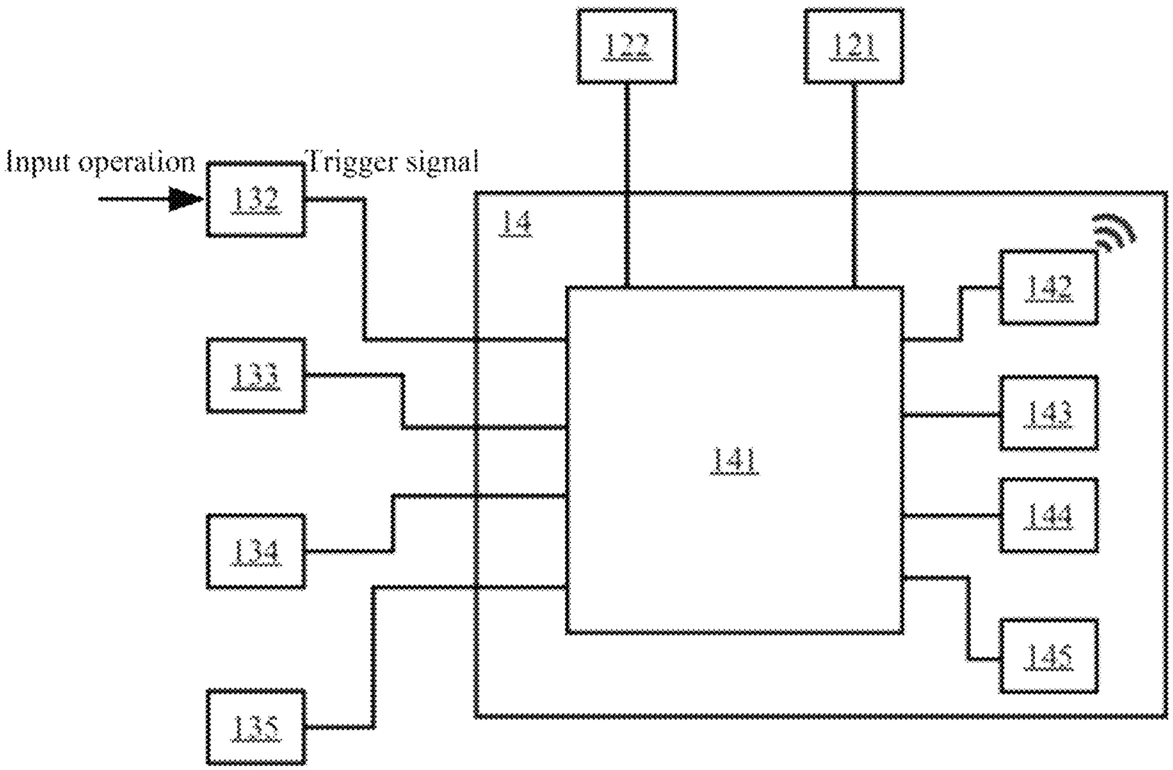
FIG. 3 is a schematic block diagram illustrating a control device of the intelligent toilet seat shown in FIG. 2 according to an embodiment of the present disclosure.

FIG. 3 illustrates the control device 14 according to an embodiment of the present disclosure. The control device 14 includes a control module 141 and the IoT communication module 142 electrically connected with the control module 141.

The control module 141 can be implemented as a microcontroller (MCU) or a microprocessor. The control module 141 can adopt a chip that meets requirements of signal processing performance, and the chip may be arranged on a circuit board in the cavity.

The IoT communication module 142 can adopt a chip that conforms to the applicable environment and meets requirements of wireless communication distance, and the chip may be installed on a circuit board in the cavity. The control module 141 and the IoT communication module 142 may be arranged on the same circuit board or on different circuit boards, and may be electrically connected with each other.

The IoT communication module 142 can establish a wireless communication connection with a router and a user device respectively. For example, the IoT communication module 142 wirelessly communicates with the user device (such as the smartphone of the user of the toilet 100) through Bluetooth to transmit data between the intelligent toilet seat 10 and the user device. The IoT communication module 142 wirelessly communicates with the router through WiFi and wirelessly communicates with a cloud server via the router to exchange data between the intelligent toilet seat 10 and the cloud server. In addition, the user device may also wirelessly communicate with the cloud server through, for example, 4G or 5G, to transmit data between the intelligent toilet seat 10 and the user device via the router and the cloud server. Thus, the IoT communication module 142 can send data which can be received by the device communicated with the IoT communication module 142 and can receive data from the device communicated with the IoT communication module 142.

The control module 141 is electrically connected with the reminder button 132, the temperature adjustment button 133, the heating indicator light 134 and the connection indicator light 135 through wires. The control module 141 is also electrically connected with the seating sensor 121 and the heater 122 through wires.

When the control module 141 receives a trigger signal from the reminder button 132, the control module 141 controls the IoT communication module 142 to send a reminder signal. The reminder signal can be transmitted in various forms, which can be set according to user needs or application scenarios. For example, the IoT communication module 142 can send the reminder signal continually until receiving a response signal from the user device (e.g., the user of the user device sends a response signal indicating obtaining a reminder information by operating the APP after seeing the reminder information). For example, the IoT communication module 142 can send the reminder signal at a predetermined frequency (e.g., every 5 seconds) until receiving the response signal from the user device. For example, the IoT communication module 142 can send the reminder signal for a predetermined duration (e.g., 30 seconds). For example, the IoT communication module 142 may only send the reminder signal once. It should be understood that how to send the reminder signal, such as the predetermined duration and frequency, can be adjusted based on application scenarios and user needs.

The control module 141 controls the heater 122 to increase or decrease the temperature accordingly when receiving a temperature increase signal or a temperature decrease signal from the temperature adjustment button. In some embodiments, a driver (not shown) for driving the heater 122 is electrically connected between the control module 141 and the heater 122. The control module 14 controls the temperature increase or temperature decrease of the heater 122 by controlling the driver.

When the control module 141 receives a detection signal from the seating sensor 121 indicating that the toilet seat ring 12 is seated, the control module 141 controls the heater 122 to start heating the toilet seat ring 12. The control module 141 can also receive a command signal from the user device through the IoT communication module 142, the command signal may include an instruction to start or stop heating the toilet seat ring 12, a setting of a heating duration of the toilet seat ring 12, and an adjustment setting of the toilet seat ring 12. The control module 141 controls the heater 122 to perform corresponding operations based on the command signal.

In some embodiments, the control device 14 further includes a timing module 144. The timing module 144 may be integrated with the control module 141 or independent of the control module 141. The timing module 144 can be electrically connected with the seating sensor 121 and perform timing based on the detection signal output by the seating sensor 121. The timing module 144 can also perform timing under the control of the control module 141. For example, when the control module 141 receives the detection signal indicating that the toilet seat ring 12 has been seated from the seating sensor 121, the control module 141 controls the timing module 144 to start timing, and when the control module 141 receives a detection signal indicating that the user has left the toilet seat ring 12 from the seating sensor 121, the control module 141 controls the timing module 144 to stop timing. The control device 14 controls the timing module 144 to transmit timing data to the user device and/or the cloud server through the IoT communication module 142.

In some embodiments, the control device 14 further includes a power source 143, such as a battery. The power supply 143 is arranged in the cavity to supply power to electrical components of the control device 14. Therefore, even if a plug of the toilet 100 is not plugged into a power socket or has poor contact with the power socket, the function of the control device 14, especially the function of sending the reminder signal in response to the trigger signal of the reminder button 132, can still work.

In some embodiments, the intelligent toilet seat 10 further includes a buzzer 145. The buzzer 145 is electrically connected with the control module 141 through a wire. When the control module 141 receives the trigger signal from the reminder button 132, the control module 141 controls the buzzer 145 to emit a prompt sound (such as a beep sound, or a voice broadcast or music with a reminder function). The prompt sound can be emitted in a gradually increasing form until the IoT communication module 142 receives the response signal from the user device indicating that the reminder information has been received. This is particularly suitable for scenarios where the elderly people are in a bathroom or other functional rooms in their sons and daughters' house. The buzzer 145 may be arranged in the cavity, and the prompt sound is transmitted through a slit (not shown) on the seat box housing 131. The buzzer 145 may also be arranged on the side wall of the seat box housing 131. In addition, the duration of the prompt sound from the buzzer may be set through a user APP.

In addition, in some embodiments, the buzzer 145 may also be electrically connected with the reminder button 132. The buzzer 145 emits the prompt sound when receiving the trigger signal from the reminder button 132. That is, the buzzer 145 may be directly triggered by the trigger signal of the reminder button 132 to emit the prompt sound. In some embodiments, after the buzzer 145 is triggered to emit the prompt sound, the prompt sound may be stopped under the control of the control module 141.

It should be understood that the modules of the control module 14 may be implemented as one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, state machines, gate logics, discrete hardware circuits, electronic units designed to perform functions thereof, or a combination thereof.

Therefore, according to some embodiments of the present disclosure, the intelligent toilet seat has a high integrated level and a compact structure, and only needs simple operation to send the reminder signal, which is particularly suitable for the elderly solitary people.

According to another aspect of the present disclosure, a monitoring system based on an intelligent toilet seat is provided. The monitoring system includes an intelligent toilet seat and one or multiple APPs (applications). The one or multiple APPs are designed specifically for the intelligent toilet seat 10 and suitable for use with a variety of operating systems, such as an android operating system and an IOS operating system. The one or multiple APPs include versions that can be logged in and used on a web page, and versions that can be logged in and used with an application on the user device (e.g., a smartphone or tablet). The one or multiple APPs may be installed on one or more of a user device, a cloud server, and a computing device which wirelessly communicates with the cloud server. In the case of multiple APPs, each APP may be installed on one user device, for example, a smartphone of a relative of the elderly people who use the toilet 100. Thus, the signal containing the information of the condition that the elderly people use the toilet, particularly the reminder signal, can be received by relatives of the elderly people at the same time, so that the problem that measures cannot be taken in time because the reminder signal is ignored when one person is in a meeting can be avoided.

Figure 4:
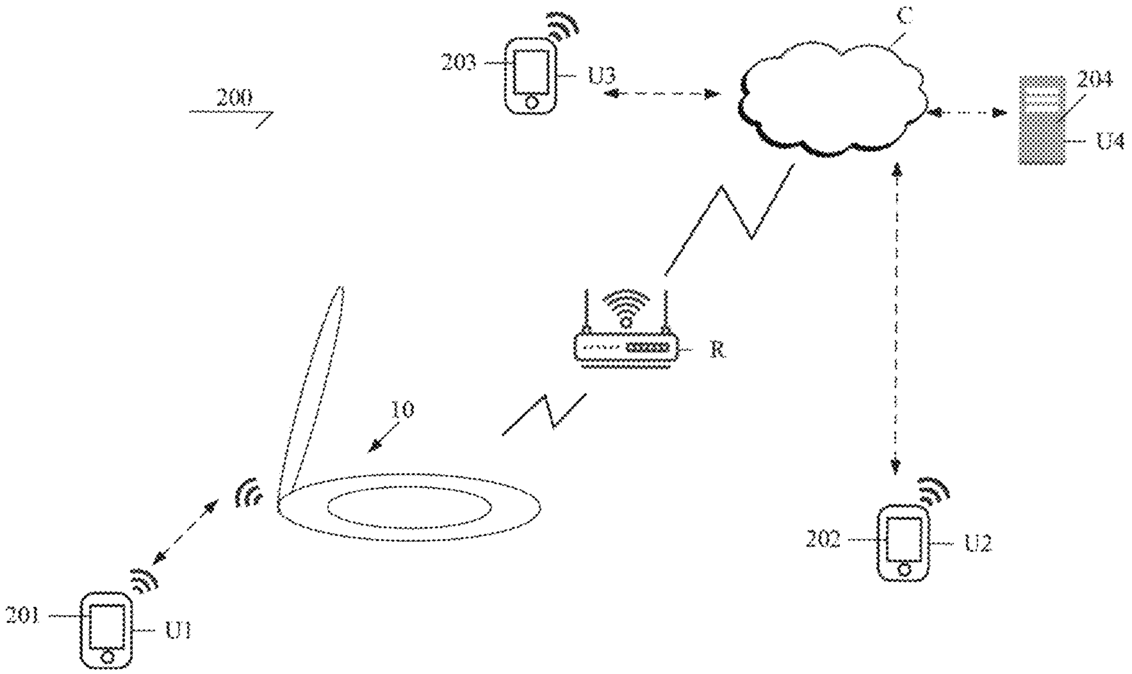
FIG. 4 is a schematic view illustrating a monitoring system based on an intelligent toilet seat according to an embodiment of the present disclosure.

FIG. 4 illustrates a monitoring system 200 according to an embodiment of the present disclosure. The system architecture and operating principle of the monitoring system 200 are described below with reference to FIG. 4. The monitoring system 200 may be considered as an intelligent home system based on an IoT technology, and the intelligent toilet seat 10 described above is a home device equipped with an IoT communication module (e.g., an IoT sensor) capable of connecting with a network. In FIG. 4, the monitoring system includes multiple APPs. It should be understood that the monitoring system 200 may also include only one of the multiple APPs. The above description of features of the intelligent toilet seat 10 is equally applicable herein and will not be repeated herein.

As shown in FIG. 4, the monitoring system 200 includes an intelligent toilet seat 10 and multiple APPs 201 to 204. APPs 201 to 203 are respectively installed on one of user devices U1 to U3, and APP 204 is installed as a web page version APP on a management platform or a management server computer U4. It should be understand that interfaces and functions of the APP installed on the management platform or the management server computer may be slightly different from the APP installed on the user devices in order to implement customized management functions. In some embodiments of network connections, the user devices U1 to U3 can communicate with the intelligent toilet seat 10 via a local Bluetooth or a cloud server. For example, the user device U1 can be in direct communication with the intelligent toilet seat 10 via Bluetooth. The user devices U2 to U4 can communicate with the intelligent toilet seat 10 via a cloud server. The user device U2 can communicate with a cloud server C via a router R and communicate with the management platform or the management server computer U4 through the cloud server C.

In addition, the user devices U1 to U3 need to be respectively paired with the intelligent toilet seat 10 to communicate data with the intelligent toilet seat 10. The management platform or the management server computer U4 needs to be authenticated by the intelligent toilet seat 10 to communicate data with the intelligent toilet seat 10. Therefore, a privacy of user data can be protected, and a data security of the monitoring system 200 can be improved.

In addition, the monitoring system 200 may be configured to locally allocate the network for devices by an APP. Then, all authorized APPs can transmit data associated with the intelligent toilet seat 10 via wireless communication.

In some embodiments, the reminder signal from the intelligent toilet seat 10 can be received simultaneously by multiple user devices in wireless communication therewith and presented on the human machine interface of APPs 201 to 204 of respective user devices U1 to U4.

In some embodiments, the user can remotely control the intelligent toilet seat 10 by operating the APP (e.g., one of APPs 201-204), for example, remotely control heating start time and heating duration of the intelligent toilet seat 10. In addition, switching of the intelligent toilet seat 10 between multiple levels corresponding to heating to different temperatures may also be controlled by the APP. For example, there are three levels including Level 1 to Level 3 corresponding to three different temperatures. The three levels, Level 1 to Level 3, corresponding to three temperatures from low to high, can be controlled and adjusted through the App.

In some embodiments, the APP in each user device can perform various statistical analyses on the received data regarding the usage of the toilet, and present the data in the form of a chart and/or text on the human machine interface of the APP. The APP can also generate a toilet usage report periodically based on the data received regarding the usage of the toilet. These data regarding the usage of the toilet may also be stored in the user device and the cloud server, and taken as historical data for analysis as needed.

In some embodiments, the data may be shared between multiple user devices of the intelligent toilet seat 10 through the APP. This is particularly useful in scenarios where elderly people toileting information is communicated between multiple children of the elderly people.

Therefore, in the monitoring system according to some embodiments of the present disclosure, the information from the intelligent toilet seat can be transmitted timely, and remote control and management to the intelligent toilet seat can be realized.

Although the present disclosure has been disclosed above, the present disclosure is not limited thereto. Any changes and modifications may be made by those skilled in the art without departing from the spirit and scope of the present disclosure, and the scope of the present disclosure should be determined by the appended claims.

What is claimed is:

1. An intelligent toilet seat, comprising:

a toilet seat box comprising a seat box housing, wherein the seat box housing defines a cavity therein;

a toilet seat ring pivotally connected with the toilet seat box;

a reminder button arranged on a side wall of the seat box housing and configured to accept an input operation to generate a trigger signal; and a control device accommodated in the cavity and comprising a control module and an IoT communication module, wherein the control module is electrically connected with the reminder button and the IoT communication module respectively, and is configured to trigger the IoT communication module to wirelessly send a reminder signal to a user upon receiving the trigger signal from the reminder button;

wherein the intelligent toilet seat further comprises one or more seating sensors attached to the toilet seat ring, and the one or more seating sensors are respectively electrically connected with the control module and configured to detect whether the toilet seat ring is seated and transmit a detection result to the control module.

2. The intelligent toilet seat according to claim 1, wherein the reminder signal comprises at least one selected from a group consisting of a reminder signal sent continuously, a reminder signal sent at a predetermined frequency, a reminder signal sent for a predetermined duration and a reminder signal sent once.

3. The intelligent toilet seat according to claim 1, wherein the intelligent toilet seat further comprises a toilet cover pivotally connected with the toilet seat box, and the toilet cover and the toilet seat ring are respectively connected with the toilet seat box through pivoting shafts parallel to each other.

4. The intelligent toilet seat according to claim 1, wherein the intelligent toilet seat further comprises a temperature adjustment button arranged on the side wall of the seat box housing and electrically connected with the control module, and the temperature adjustment button comprises a temperature increase button and a temperature decrease button.

5. The intelligent toilet seat according to claim 1, wherein the intelligent toilet seat further comprises a heater configured to heat the toilet seat ring, and the heater is arranged in a housing of the toilet seat ring and electrically connected with the control module.

6. The intelligent toilet seat according to claim 1, wherein the intelligent toilet seat further comprises a heating indicator light arranged on the side wall of the seat box housing and electrically connected with the control module, and the heating indicator light has a light-on state indicating that the toilet seat ring is being heated and a light-off state indicating that the toilet seat ring is not being heated.

7. The intelligent toilet seat according to claim 1, wherein the intelligent toilet seat further comprises a connection indicator light arranged on the side wall of the seat box housing and electrically connected with the control module, and the connection indicator light has a long light-on state indicating that a network connection of the IoT communication module is normal, a light-off state indicating that a network connection function of the IoT communication module is turned off, a light slow flashing state indicating that the network connection of the IoT communication module is disconnected, and a light quick flashing state indicating that the IoT communication module is being remotely upgraded or allocated.

8. The intelligent toilet seat according to claim 1, wherein the intelligent toilet seat further comprises a buzzer arranged in the cavity or on the side wall of the seat box housing and electrically connected with the control module, and the buzzer is configured to output a prompt sound based on the trigger signal.

9. The intelligent toilet seat according to claim 1, wherein the control device further comprises a timing module electrically connected with or integrated with the control module, and the timing module is configured to time how long the toilet seat ring is seated and/or heated.

10. The intelligent toilet seat according to claim 1, wherein the control device further comprises a power supply configured to provide power to an electrical module of the control device.

11. A toilet, comprising:

a toilet body; and an intelligent toilet seat according to claim 1, wherein the intelligent toilet seat is detachably connected with the toilet body.

12. A monitoring system based on an intelligent toilet seat, comprising:

an intelligent toilet seat according to claim 1; and one or multiple applications (APPs) installed on a user equipment and/or a cloud server of the intelligent toilet seat, wherein data associated with the intelligent toilet seat is wirelessly transmitted between the intelligent toilet seat and the one or multiple APPs, and the one or multiple APPs are configured to remotely control the intelligent toilet seat.

13. The monitoring system according to claim 12, wherein the monitoring system comprises the multiple APPs, wherein one APP wirelessly communicates with one or more of the intelligent toilet seat, other APPs and the cloud server to transmit data associated with the intelligent toilet seat.

14. The monitoring system according to claim 12, wherein the intelligent toilet seat wirelessly communicates with the cloud server via a router.

* * * * *